United States Patent
Kosaka

(10) Patent No.: US 10,498,967 B2
(45) Date of Patent: Dec. 3, 2019

(54) IMAGE PICKUP APPARATUS THAT PERFORMS PHOTOMETRIC CONTROL BY USING IMAGE SENSOR, CONTROL METHOD THEREFOR, AND STORAGE MEDIUM

(71) Applicant: CANON KABUSHIKI KAISHA, Tokyo (JP)

(72) Inventor: Takashi Kosaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/009,774

(22) Filed: Jun. 15, 2018

(65) Prior Publication Data

US 2018/0367735 A1    Dec. 20, 2018

(30) Foreign Application Priority Data

Jun. 19, 2017    (JP) ................. 2017-119640

(51) Int. Cl.
*H04N 5/222*    (2006.01)
*H04N 5/232*    (2006.01)
*H04N 5/235*    (2006.01)

(52) U.S. Cl.
CPC ....... *H04N 5/23293* (2013.01); *H04N 5/2351* (2013.01); *H04N 5/2352* (2013.01); *H04N 5/2353* (2013.01); *H04N 5/23245* (2013.01)

(58) Field of Classification Search
CPC .................................................. H04N 5/2351
See application file for complete search history.

(56) References Cited

U.S. PATENT DOCUMENTS

| | | | | |
|---|---|---|---|---|
| 7,889,237 | B2* | 2/2011 | Okumura | H04N 5/2253 348/208.4 |
| 8,130,308 | B2* | 3/2012 | Matsui | H04N 5/23293 348/333.01 |
| 2006/0256203 | A1* | 11/2006 | Honma | H04N 5/232 348/220.1 |

FOREIGN PATENT DOCUMENTS

JP    2010016762 A    1/2010
JP    2010072201 A    4/2010

* cited by examiner

*Primary Examiner* — Gary C Vieaux
(74) *Attorney, Agent, or Firm* — Rossi, Kimms & McDowell LLP

(57) ABSTRACT

An image pickup apparatus capable of, when a photometry is performed using an output of an image sensor, performing the photometry without being affected by a diaphragm of an image pickup optical system is provided. A mode is switched between a display mode in which an image according to the image signal which is an output of the image sensor is displayed as a live image and a non-display mode in which the live image is not displayed. In the display mode, a lower limit value of an accumulation time during which an electric charge is accumulated in the image sensor at a time of photometry is controlled to a first lower limit value. In the non-display mode, the lower limit value of the accumulation time is controlled to a second lower limit value lower than the first lower limit value.

13 Claims, 4 Drawing Sheets

FIG. 3

| HD TIME |
|---|
| 0.015 msec/HD |

SHUTTER SPEED BY 1/8 STEP INCREMENTS (1/15–1/8000)
ACTUAL TIME TABLE (SECONDS)

| SH SPEED | Tv | 0 | 1 | 2 | 3 | 4 | 5 | 6 | 7 |
|---|---|---|---|---|---|---|---|---|---|
| 1/15 | 4 | 0.062500 | 0.057313 | 0.052556 | 0.048194 | 0.044194 | 0.040526 | 0.037163 | 0.034078 |
| 1/30 | 5 | 0.031250 | 0.028656 | 0.026278 | 0.024097 | 0.022097 | 0.020263 | 0.018581 | 0.017039 |
| 1/60 | 6 | 0.015625 | 0.014328 | 0.013139 | 0.012049 | 0.011049 | 0.010132 | 0.009291 | 0.008520 |
| 1/125 | 7 | 0.007813 | 0.007164 | 0.006570 | 0.006024 | 0.005524 | 0.005066 | 0.004645 | 0.004260 |
| 1/250 | 8 | 0.003906 | 0.003582 | 0.003285 | 0.003012 | 0.002762 | 0.002533 | 0.002323 | 0.002130 |
| 1/500 | 9 | 0.001953 | 0.001791 | 0.001642 | 0.001506 | 0.001381 | 0.001266 | 0.001161 | 0.001065 |
| 1/1000 | 10 | 0.000977 | 0.000896 | 0.000821 | 0.000753 | 0.000691 | 0.000633 | 0.000581 | 0.000532 |
| 1/2000 | 11 | 0.000488 | 0.000448 | 0.000411 | 0.000377 | 0.000345 | 0.000317 | 0.000290 | 0.000266 |
| 1/4000 | 12 | 0.000244 | 0.000224 | 0.000205 | 0.000188 | 0.000173 | 0.000158 | 0.000145 | 0.000133 |
| 1/8000 | 13 | 0.000122 | 0.000112 | 0.000103 | 0.000094 | 0.000086 | 0.000079 | 0.000073 | 0.000067 |
| 1/16000 | 14 | 0.000061 | 0.000056 | 0.000051 | 0.000047 | 0.000043 | 0.000040 | 0.000036 | 0.000033 |
| 1/32000 | 15 | 0.000031 | 0.000028 | 0.000026 | 0.000024 | 0.000022 | 0.000020 | 0.000018 | 0.000017 |
| 1/64000 | 16 | 0.000015 | 0.000014 | 0.000013 | 0.000012 | 0.000011 | 0.000010 | 0.000009 | 0.000008 |

CONVERSION TABLE

| | | 0 | 1 | 2 | 3 | 4 | 5 | 6 | 7 |
|---|---|---|---|---|---|---|---|---|---|
| 1/15 | 4 | 4166 | 3820 | 3503 | 3212 | 2946 | 2701 | 2477 | 2271 |
| 1/30 | 5 | 2083 | 1910 | 1751 | 1606 | 1473 | 1350 | 1238 | 1135 |
| 1/60 | 6 | 1041 | 955 | 875 | 803 | 736 | 675 | 619 | 567 |
| 1/125 | 7 | 520 | 477 | 437 | 401 | 368 | 337 | 309 | 283 |
| 1/250 | 8 | 260 | 238 | 218 | 200 | 184 | 168 | 154 | 141 |
| 1/500 | 9 | 130 | 119 | 109 | 100 | 92 | 84 | 77 | 70 |
| 1/1000 | 10 | 65 | 59 | 54 | 50 | 46 | 42 | 38 | 35 |
| 1/2000 | 11 | 32 | 29 | 27 | 25 | 23 | 21 | 19 | 17 |
| 1/4000 | 12 | 16 | 14 | 13 | 12 | 11 | 10 | 9 | 8 |
| 1/8000 | 13 | 8 | 7 | 6 | 6 | 5 | 5 | 4 | 4 |
| 1/16000 | 14 | 4 | 3 | 3 | 3 | 2 | 2 | 2 | 2 |
| 1/32000 | 15 | 2 | 1 | 1 | 1 | 1 | 1 | 1 | 1 |
| 1/64000 | 16 | 1 | 0 | 0 | 0 | 0 | 0 | 0 | 0 |

IMAGE PICKUP APPARATUS THAT PERFORMS PHOTOMETRIC CONTROL BY USING IMAGE SENSOR, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to a photometric control by using an image sensor.

Description of the Related Art

Generally, some of image pickup apparatuses such as digital cameras have a so called live view function. By the live view function, images according to image signals continuously read out from an image sensor are sequentially displayed on a display device such as a liquid crystal display. Accordingly, a user is able to easily check a subject.

On the other hand, when the user checks the subject via an optical viewfinder, it is advantageous to observe the subject in an actual time, and some image pickup apparatus having the live view function can switch between the optical viewfinder and the live view function.

In General, in a case where both the optical viewfinder and the live view function are installed in an image pickup apparatus, a position of an optical path dividing mirror is switched so that an optical image having passed through an image pickup optical system is guided to either of the optical viewfinder or the image sensor. Accordingly, two photometry devices and two distance measurement device are necessary, which makes a circuit configuration complicated.

In order to prevent the circuit configuration from being complicated as described above, for example, there has been proposed a technique about a photometric process and a distance measurement process for a case where an optical path dividing mirror comprised of a half mirror is set on an optical path from an image pickup optical system to an image sensor (See, Japanese Laid-Open Patent Publication (Kokai) No. 2010-16762). In this technique, the photometric process and the distance measurement process are performed by using an image signal and a focus detection signal output from the image sensor according to the optical image having passed through the optical path dividing mirror.

Further, there has been proposed a technique in which, when a light amount of an optical image having passed through a half mirror is not enough, a photometry is performed by retracting an optical path dividing mirror (See, Japanese Laid-Open Patent Publication (Kokai) No. 2010-72201).

In a case of a live view, the photometry is performed based on an image signal read out from the image sensor. In this embodiment, the photometry is performed by converting an analog image signal output from the image sensor into a digital image signal by an A/D converter. Then, a photometric luminance range according to the image signal output from the image sensor is decided based on a dynamic range characteristic of the A/D converter. For example, when an output of the A/D converter is a 14-bit signal, the photometric luminance range includes about plus/minus three degrees.

FIG. 4 is a view for use in explaining a photometric control during a live view in a conventional image pickup apparatus.

Assuming now that a subject having a brightness exceeding three steps compared to a brightness to be controlled in the live view. In this embodiment, if the photometric luminance range is limited as described earlier, it is necessary to perform a plurality of times of photometry while switching an accumulation time period (TV) of the image sensor, a readout gain (ISO), and a diaphragm (AV).

Assuming again that the photometry based on the image signal readout from the image sensor while the optical viewfinder is in use. In this embodiment, if the photometry is performed in the same manner as the case of the live view, it is necessary to control a diaphragm of the image pickup optical system.

Generally, on the other hand, an image of the optical viewfinder is preferable to be bright. Moreover, when a focus is checked using the optical viewfinder, it is difficult to check a focus if a diaphragm is small due to a deep depth of field. Therefore, it is preferable to keep the diaphragm open. This holds true for a case where a distance measurement is performed based on an image signal read out from the image pickup apparatus, and it is thus impossible to accurately perform a distance measurement with a small diaphragm. However, there is a problem that a high luminance limit of the photometry becomes lower if a diaphragm is fixed to an opened state. This problem holds true for signal processing in which a predetermined plurality of element rows (first rows) and a predetermined plurality of element rows (second rows) which does not overlap with the predetermined plurality of rows (first rows) in the image sensor are independently driven, and, for example, a live view image signal for display and image signals for the photometry and the distance measurement are output at the same time from the image sensor.

SUMMARY OF THE INVENTION

The present invention provides an image pickup apparatus and a control method therefore which are capable of, when a photometry is performed using an output of an image sensor, performing the photometry without being affected by a diaphragm of an image pickup optical system, and a storage medium.

Accordingly, the present invention provides (claim 1).

According to the present invention, when the photometry is performed using the output of the image sensor, the photometry is performed without being affected by the diaphragm of the image pickup optical system.

Further features of the present invention will become apparent from the following description of exemplary embodiments (with reference to the attached drawings).

BRIEF DESCRIPTION OF THE DRAWINGS

FIG. 3 is a diaphragm showing an example of shutter speeds used in the camera appearing in FIG. 1.

DESCRIPTION OF THE EMBODIMENTS

Figure 1:
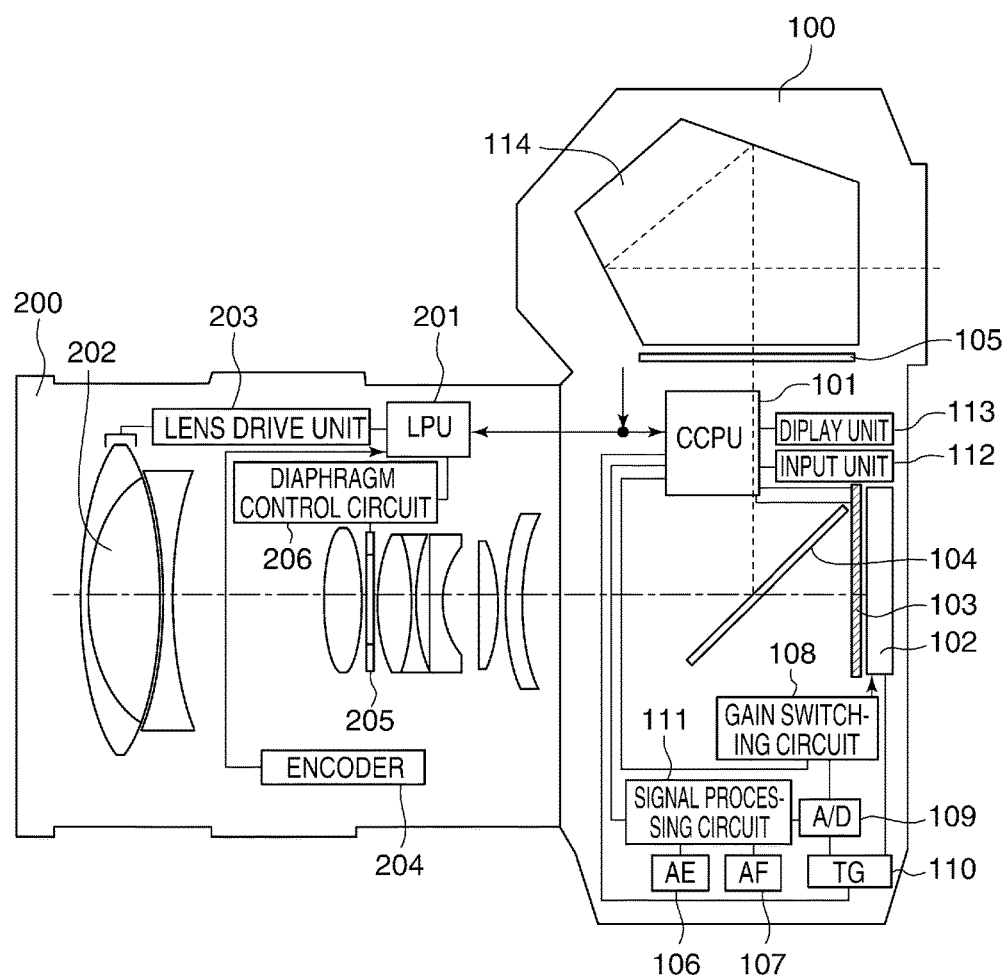
FIG. 1 is a view showing an example of an arrangement of an image pickup apparatus according to an embodiment of the present invention.

A description will be given of an example of an image pickup apparatus according to an embodiment of the present invention by referring to the drawings.

FIG. 1 is a view showing an example of an arrangement of the image pickup apparatus according the embodiment of the present invention.

The image pickup apparatus shown in the figure is, for example, a digital camera of a single-lens reflex type (hereinafter, merely referred to as "the camera"), and has an image pickup apparatus main body (camera main body) 100 and a interchangeable lens unit (hereinafter, merely referred to as "the interchangeable lens") 200. The interchangeable lens 200 is attachable to and detachable from the camera main body 100.

The camera main body 100 has a microcomputer (CCPU: hereinafter referred to as "the camera microcomputer") 101 which comprises, for example, a CPU, a RAM, and a ROM although not shown in the figure. The camera microcomputer 101 controls overall operation of the camera.

An image sensor 102 is a CMOS image sensor which comprises an infrared cut filter, a low-pass filter, and so on, and an optical image (subject image) is formed on the image sensor 102 via the interchangeable lens 200.

A shutter 103 is arranged on a front side of the image sensor 102 and shields the image sensor 102 from light when an image is read out from the image sensor 102. On the other hand, during the live view or shooting, the shutter 103 is opened, and an optical image is formed on the image sensor 102.

It should be noted that a shutter control circuit (not shown in the figure) drivingly controls the shutter 103 under control of the camera microcomputer 101. In this embodiment, the shutter 103 is a focal plane shutter, and the shutter control circuit performs an exposure operation by controlling a shutter driving magnet constituting the focal plane shutter to run a shutter curtain.

A photointerrupter is built in the shutter 103, and a position of blades of the shutter 103 is detected by the photointerrupter. The camera microcomputer 101 determines timing such as complete timing of running of the shutter 103 in accordance with a result of the detection.

A light flux dividing device 104 which is comprised of a half mirror is arranged on a front side of the shutter 103. During a non-shooting and non-live view state, the light flux dividing device 104 reflects a part of light incident from the interchangeable lens 200 to form an image on a focusing plate 105. The user confirms a focus by visually check an optical image formed on the focusing plate 105 through an optical viewfinder.

A photometry circuit (AE) 106 cooperates with a digital signal processing circuit (hereinafter, merely referred to as "the signal processing circuit") 111 to perform a photometric control in accordance with an image signal obtained by the image sensor 102. A focus detection circuit (AF) 107 cooperates with the signal processing circuit 111 to perform focus detection in accordance with the image signal obtained by the image sensor 102.

A gain switching circuit 108 switches amplifying gains for amplifying an output of the image sensor 102. Switching of the amplifying gains is controlled by the camera microcomputer 101 depending on a shooting condition and an input by a user. An A/D converter 109 converts an analog image signal (after being amplified), which is an output of the image sensor 102, into a digital image signal. A timing generator (TG) 110 outputs a timing signal for synchronizing an input of the analog image signal to the A/D converter 109 and timing to perform conversion by the A/D converter 109.

The signal processing circuit 111 subjects the digital image signal, which is an output of the A/D converter 109, to predetermined image processing to generate image data based on a predetermined parameter. A penta prism 114 guides the optical image formed on the focusing plate 105 to the optical viewfinder. It should be noted that an explanation about a storage unit such as a memory for storing image data is omitted here.

The camera main body 100 is equipped with a lens mount (not shown) which is an interface with a lens microcomputer 201, to be described later. The lens mount comprises a communication terminal for data communication between the lens microcomputer 201 and the camera microcomputer 101. Through the data communication, the camera microcomputer 101 can grasp a type and a state of the interchangeable lens 200.

An input unit 112 comprises, for example, shutter release buttons (SW1 and SW2) and a live view switching button. The input unit 112 also comprises a switch and a button for switching of photometric modes and switching between an arbitral selecting mode of an AF area and a multipoint/face tracking mode. The input unit 112 also comprises a switching dial for switching shooting modes including a shutter speed priority mode and a diaphragm priority mode, and a user is capable of input setting on the camera by using the input unit 112. It should be noted that the SW1 also acts as a photometry button.

A variety of set modes, other shooting information, an image obtained by shooting, and so on are displayed on a display unit 113. It should be noted that the display unit 113 is equipped with a liquid crystal display device and a light emitting element.

The interchangeable lens 200 has a microcomputer (LPU: hereinafter, referred to "the lens microcomputer") 201 which has a CPU, a RAM, a ROM, and so on, although not shown in the figure. The lens microcomputer 201 controls the overall operation of the interchangeable lens 200.

A lens group 202 comprises a plurality of lenses including, for example, a focus lens which moves along an optical axis and performs a focus adjustment.

A lens drive unit 203 causes the lens group 202 to move along the optical axis. The camera microcomputer 201 obtains a driving amount of the lens group 202 based on an output of the focus detection circuit 107. The lens microcomputer 201 controls the lens drive unit 203 based on the driving amount and causes the lens group 202 to move to a focus position.

It should be noted that when the lens group 202 is driven, a position of the lens group 202 is detected by an encoder 204. The lens microcomputer 201 controls the lens drive unit 203 in accordance with a detection result by the encoder 204. At a time of focus detection, a driving direction and a driving speed of the lens group 202 is sent from the camera microcomputer 101 to the lens microcomputer 201. Then, the lens microcomputer 201 drivingly controls the lens group 202 based on the driving direction and driving speed.

A diaphragm 205 is used for adjusting a light amount. A diaphragm drive circuit 206 drives the diaphragm 205 under control of the lens microcomputer 201. A driving amount of the diaphragm required for controlling the diaphragm 205 is notified from the camera microcomputer 101 to the lens microcomputer 201. It should be noted that a focal length of the lens group 202 may be fixed, or variable similar to a zoom lens.

Figure 2:
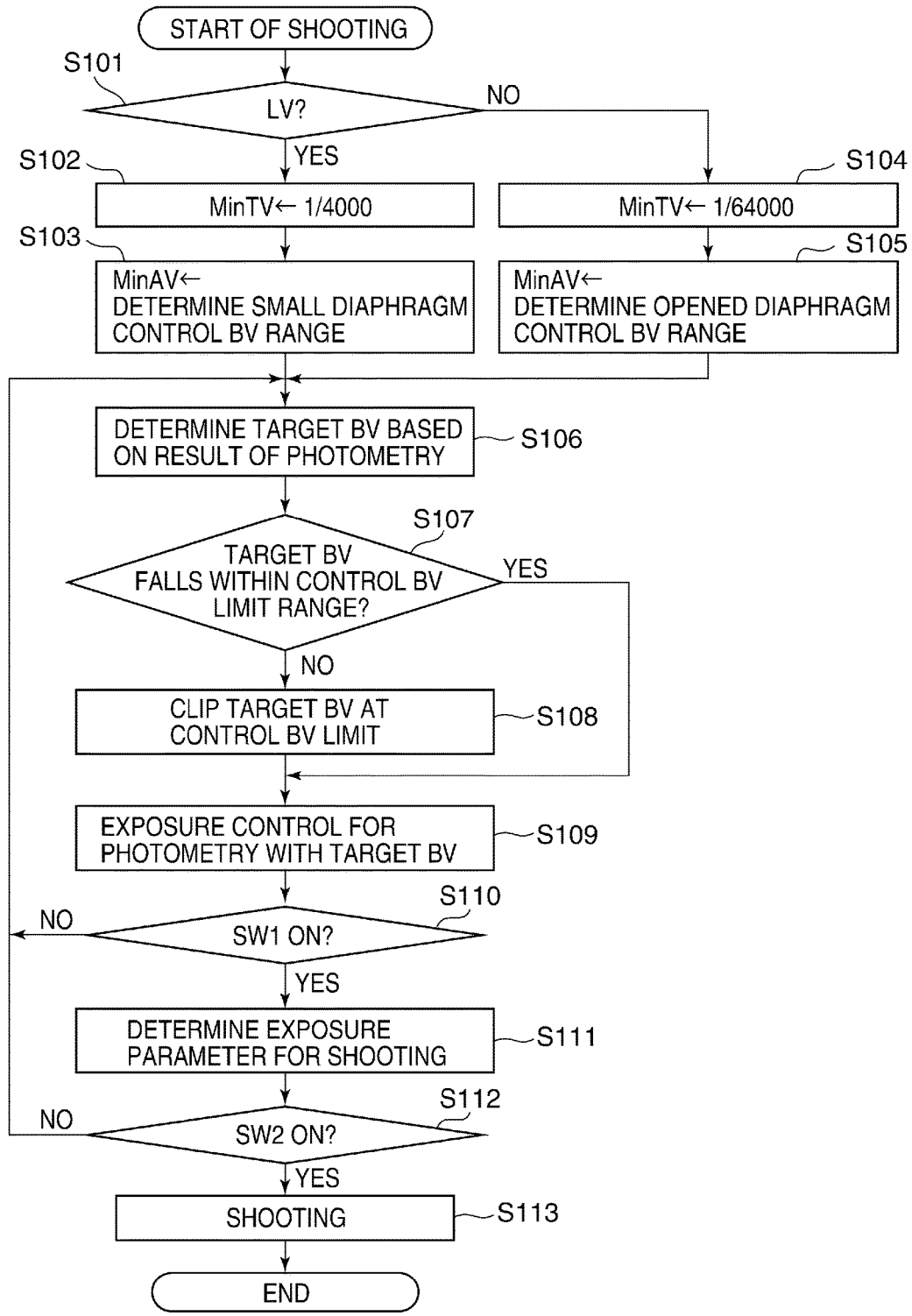
FIG. 2 is a flowchart for use in explaining an example of a shooting process performed by a camera appearing in FIG. 1.

FIG. 2 is a flowchart useful in explaining an example of a shooting process performed by the camera appearing in FIG. 1. It should be noted that processes in the shown flowchart is performed under control of the camera microcomputer 101.

At first, the camera microcomputer 101 determines whether a finder mode set by the input unit 112 is a live view mode (LV) (step S101). In this embodiment, the user is able to selectively switch between an optical viewfinder mode (non-display mode) and the live view mode (LV: display mode).

In the optical viewfinder mode, the light flux dividing device 104 is arranged at a down position, that is, on a shooting optical path, thereby an optical image formed on the focusing plate 105 is observed by the optical viewfinder via the pentaprism 114. On the other hand, in the live view mode, the light flux dividing device 104 is arranged at an up position, that is, a position retracted from the shooting optical path, thereby an image obtained by the image sensor 102 is observed by the display unit 113.

Upon determining that the finder mode is the LV (YES in step S101), the camera microcomputer 101 sets a limit time (first limit time: first lower limit value) on a high-speed shutter time side regarding a charge accumulation period in the image sensor 102 (step S102). It should be note that a TV value is set for the limit time.

FIG. 3 is a diagram showing an example of shutter speeds used in the camera in FIG. 1.

In FIG. 3, actual times (seconds) of the TVs defined by ⅛ step increments are shown on an upper half of FIG. 3, and a conversion table to HD numbers which are settable in the camera is shown on a lower half of FIG. 3. The image sensor 102 in FIG. 1 performs a charge accumulation control in a rolling shutter method, and a resolution in a charge accumulation period is decided based on a reference unit time of an HD clock, which corresponds to a read-out cycle for one row in a horizontal direction. In this embodiment, the conversion table in a case where the reference unit time of the HD clock is 15 μ seconds.

For example, when a TV is ⅟30 seconds, "2083" is set for the HD number. A part with slash in the table in the lower half indicates an area in which linearity in the TV by ⅛ step increments cannot be kept. For example, an exposure difference of ⅛ steps is supposed to be necessary between a case where TV is ⅟4000 seconds+⅞ steps and a case where TV is ⅟8000 seconds. However, in this example, a difference between charge accumulation periods with respect to the reference unit time of the HD clock is relatively short, and thus a converted value to the HD number is "8" in the both cases. As a result, the exposure difference cannot be secured.

Referring again to FIG. 2, in the process in step S102 described earlier, the camera microcomputer 101 sets ⅟4000 seconds as a minimum accumulation period (Min TV), which is a first limit time for use in exposure control in the live view mode. Namely, with consideration given to the exposure control by ⅛ step increments, the TV is controlled in a range where the exposure control is performed with keeping the linearity.

Subsequently, the camera microcomputer 101 decides a diaphragm control range and a controllable BV range (luminance control range) for exposure control (step S103). In the process in step S103, the camera microcomputer 101 decides a BV range for the exposure control based on the TV and the diaphragm control range of the interchangeable lens 200. At this time, the camera microcomputer 101 sets a small diaphragm as a minimum AV (Min AV). In this embodiment, it is assumed that from ISO 100 to ISO 6400 can be used for an ISO sensitivity without limitation. The BV range for the exposure control indicates a luminance level and is obtained by a known APEX (additive system of photographic exposure) computation using the following equations (1) and (2).

$$EV=BV+SV=TV+AV \quad (1)$$

$$BV=TV+AV-SV \quad (2)$$

Here, TV indicates a shutter speed, AV indicates a diaphragm value, SV indicates an ISO sensitivity, and EV indicates a subject luminance.

On the other hand, upon determining that the finder mode is not the LV (NO in step S101), the camera microcomputer 101 sets a limit time (second limit time: second lower limit value) for the photometry and the distance measurement which is used in the optical viewfinder mode (step S104). For example, the camera microcomputer 101 sets ⅟64000 seconds as the minimum accumulation period (Min TV) which is the second limit time. Although when the TV is ⅟64000 seconds, 15μ seconds may be set as the accumulation period, the linearity by the ⅛ step increments cannot be ensured for immediately before and after TV values.

Figure 4:
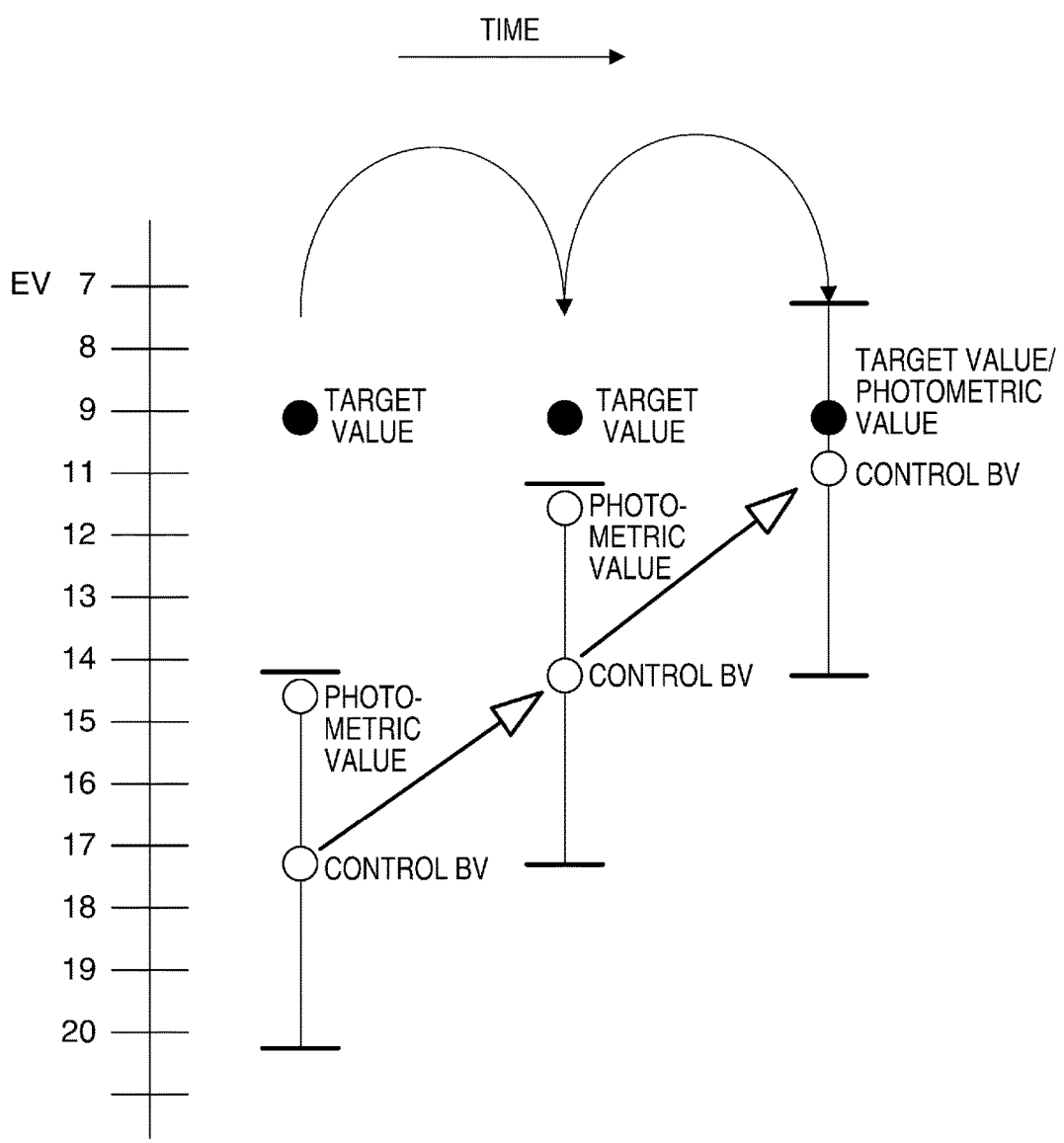
FIG. 4 is a view for use in explaining a photometric control during a live view in a conventional image pickup apparatus.

In the optical viewfinder mode, since a so called live image is not displayed, an exposure is not necessarily switched smoothly, and moreover, an appropriate exposure is not necessarily realized every ⅛ step. Accordingly, as explained above in relation to FIG. 4, the photometry with an appropriate exposure is possible as long as an exposure is controlled within a predetermined range from the appropriate exposure, for example, a range of plus/minus three steps.

The camera microcomputer 101 then decides the BV range for the exposure control from the TV value decided in the process in the step S104 and an open value of the diaphragm of the interchangeable lens 200 (step S105). At this time, the camera microcomputer 101 sets the Min AV to open.

Subsequently to the process in step S103 or the process in step S105, the camera microcomputer 101 decides a BV (target BV (target luminance value)), which is an exposure control target, based on a result of the photometry (step S106). The camera microcomputer 101 then determines whether the target BV falls within the BV range for the exposure control (control BV limit range) (step S107).

Upon determining that the target BV does not fall within the control BV limit range (NO in step S107), the camera microcomputer 101 clips the target BV at a control BV limit and set the clipped target BV as a clip target luminance value (step S108). The camera microcomputer 101 then updates the exposure control value at the time of the live view and the photometry based on the target BV value and performs the exposure control for the image sensor 102 (step S109). It should be noted that when the camera microcomputer 101 determines that the target BV falls within the control BV limit range (YES in step S107), the process proceeds to step S109.

Here, the exposure control value at the time of the live view and the photometry is decided independently from a shutter speed and a diaphragm value set for still image shooting. A brightness of a live image displayed in the live view mode is substantially equal to that of a still image obtained by shooting.

The camera microcomputer 101 then determines whether the SW1 is ON (step S110). When the camera microcomputer 101 determines that the SW1 is OFF (NO in step S110), the process returns to step S106. On the other hand, upon determining that the SW1 is ON (YES in the step S110), the camera microcomputer 101 decides an exposure parameter for the still image shooting based on the result of the photometry up to this point (step S111). In this case, the exposure parameter can be decided independently from the TV value and the AV value for the live view and the photometry decided in the processes in the steps S102 to S104.

The camera microcomputer 101 then determines whether the SW2 is ON (step S112). When the camera microcomputer 101 determines the SW2 is OFF (NO in step S112), the process returns to the step S106. On the other hand, upon determining that the SW2 is ON (YES in step S112), the camera microcomputer 101 performs the still image shooting in accordance with the exposure parameter decided in step S111 (step S113). The camera microcomputer 101 then ends the shooting process.

As described above, in the embodiment of the present invention, the charge accumulation period of the image sensor 102 is controlled within a range where a stepwise predetermined exposure difference can be realized in the live view mode in which the live image is displayed. This makes a change in an exposure of the live image smooth. On the other hand, a settable charge accumulation period is used to the limit on a short-time side in the optical viewfinder mode in which no live image is displayed. As a result, the photometric control with a diaphragm opened is possible. Moreover, the above described technique can be applied to an image sensor which supports a so called multi-stream readout in which a predetermined plurality of rows (first rows) and a predetermined plurality of rows (second rows) which does not overlap with the predetermined plurality of rows (first rows) in the image sensor can be driven independently with each other even without an optical viewfinder. In this case, a photometric control with a diaphragm opened is also possible by making settings of a readout signal used for the photometry control different from that for a live view image in an arrangement in which a live view image for live-image display and image signals for the photometry and the distance measurement are output at the same time from the image pickup sensor and respectively subjected to image processing.

Consequently, in the embodiment of the present invention, the photometry by the image sensor is performed without using a small diaphragm range of the image optical system, that is, without being affected by the diaphragm of the image pickup optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-119640, filed Jun. 19, 2017, which is hereby incorporated by reference herein in its entirety.

What is claimed is:

1. An image pickup apparatus having an image sensor that outputs an image signal according to an optical image, the image pickup apparatus comprising:
   a switch configured to cause the image pickup apparatus to switch between a display mode in which an image according to the image signal which is an output of the image sensor is displayed as a live image on a display and a non-display mode in which the live image is not displayed on the display; and
   control circuitry configured to, at a time of photometry, control a lower limit value of an accumulation time during which an electric charge is accumulated in the image sensor to a first lower limit value in the display mode, and control the lower limit value of the accumulation time to a second lower limit value lower than the first lower limit value in the non-display mode.

2. The image pickup apparatus according to claim 1, wherein in the non-display mode, the control circuitry controls a lower limit value of a shutter speed to a lower value than that in the display mode to control the second lower limit value to a value lower than the first lower limit value.

3. The image pickup apparatus according to claim 1, further comprising an optical viewfinder for visually checking the optical image,
   wherein in the non-display mode, the control circuitry guides the optical image to the optical viewfinder.

4. The image pickup apparatus according to claim 1, further comprising a photometry circuit configured to perform the photometry based on the image signal which is the output of the image sensor.

5. The image pickup apparatus according to claim 4, wherein in the display mode, the control circuitry sets a diaphragm to a small diaphragm and decides a luminance control range based on a range of a shutter speed and a control range of the diaphragm.

6. The image pickup apparatus according to claim 5, wherein in a case where the target luminance value does not fall within the luminance control range, the control circuitry clips the target luminance value at a limit of the luminance control range and sets the clipped target luminance value as a clip target luminance value.

7. The image pickup apparatus according to claim 6, wherein the control circuitry performs exposure control based on the target luminance value or the clip target luminance value.

8. The image pickup apparatus according to claim 4, wherein in the non-display mode, the control circuitry opens a diaphragm and decides a luminance control range based on a range of a shutter speed and a control range of the diaphragm.

9. The image pickup apparatus according to claim 8, wherein in a case where the target luminance value does not fall within the luminance control range, the control circuitry clips the target luminance value at a limit of the luminance control range and sets the clipped target luminance value as a clip target luminance value.

10. The image pickup apparatus according to claim 9, wherein the control circuitry performs exposure control based on the target luminance value or the clip target luminance value.

11. The image pickup apparatus according to claim 4, wherein the control circuitry decides a luminance value to be targeted as a target luminance value according to a result of the photometry obtained by the photometry circuit.

12. A control method for an image pickup apparatus having an image sensor that outputs an image signal according to an optical image, the control method comprising:
  switching between a display mode in which an image according to the image signal which is an output of the image sensor is displayed as a live image on a display and a non-display mode in which the live image is not displayed on the display; and
  controlling, at a time of photometry, a lower limit value of an accumulation time during which an electric charge is accumulated in the image sensor to a first lower limit value in the display mode, and controlling the lower limit value of the accumulation time to a second lower limit value lower than the first lower limit value in the non-display mode.

13. A non-transitory computer-readable storage medium storing a program for causing a computer to execute a control method for an image pickup apparatus having an image sensor that outputs an image signal according to an optical image, the control method comprising:
  switching between a display mode in which an image according to the image signal which is an output of the image sensor is displayed as a live image on a display and a non-display mode in which the live image is not displayed on the display; and
  controlling, at a time of photometry, a lower limit value of an accumulation time during which an electric charge is accumulated in the image sensor to a first lower limit value in the display mode, and controlling the lower limit value of the accumulation time to a second lower limit value lower than the first lower limit value in the non-display mode.

* * * * *